United States Patent
Dayal et al.

(10) Patent No.: US 8,570,939 B2
(45) Date of Patent: Oct. 29, 2013

(54) METHODS AND SYSTEMS FOR CHOOSING CYCLIC DELAYS IN MULTIPLE ANTENNA OFDM SYSTEMS

(75) Inventors: Pranav Dayal, San Diego, CA (US); Ayman Fawzy Naguib, Cupertino, CA (US)

(73) Assignee: QUALCOMM Incorporated, San Diego, CA (US)

(*) Notice: Subject to any disclaimer, the term of this patent is extended or adjusted under 35 U.S.C. 154(b) by 133 days.

(21) Appl. No.: 12/357,935

(22) Filed: Jan. 22, 2009

(65) Prior Publication Data

US 2009/0225646 A1    Sep. 10, 2009

Related U.S. Application Data

(60) Provisional application No. 61/036,895, filed on Mar. 14, 2008.

(51) Int. Cl.
*H04W 4/00* (2009.01)
*H04J 1/00* (2006.01)

(52) U.S. Cl.
USPC ........... 370/328; 370/343; 370/480; 455/446; 455/450

(58) Field of Classification Search
USPC ......... 370/310, 328–330, 338, 343, 344, 464, 370/468, 480; 455/422.1, 434, 445–447, 455/450
See application file for complete search history.

(56) References Cited

U.S. PATENT DOCUMENTS

| | | |
|---|---|---|
| 5,109,527 A | 4/1992 | Akerberg |
| 5,203,010 A | 4/1993 | Felix et al. |
| 5,471,662 A | 11/1995 | Shiota |
| 5,627,880 A | 5/1997 | Rozanski et al. |
| 5,745,481 A | 4/1998 | Phillips et al. |
| 5,784,695 A | 7/1998 | Upton et al. |
| 5,787,346 A | 7/1998 | Iseyama |
| 5,995,834 A | 11/1999 | Moore |
| 5,995,843 A | 11/1999 | Sjodin et al. |
| 6,112,085 A | 8/2000 | Garner et al. |
| 6,195,552 B1 | 2/2001 | Jeong et al. |
| 6,272,343 B1 | 8/2001 | Pon et al. |
| 6,490,259 B1 | 12/2002 | Agrawal et al. |
| 6,675,209 B1 | 1/2004 | Britt |
| 7,170,905 B1 | 1/2007 | Baum et al. |

(Continued)

FOREIGN PATENT DOCUMENTS

| | | |
|---|---|---|
| EP | 1648097 A2 | 4/2006 |
| EP | 1715711 A1 | 10/2006 |

(Continued)

OTHER PUBLICATIONS

International Search Report and Written Opinion—PCT/US2009/035196—International Search Authority—European Patent Office—Mar. 9, 2010.

(Continued)

*Primary Examiner* — Kerri Rose
(74) *Attorney, Agent, or Firm* — Charles E. Eggers

(57) ABSTRACT

Certain embodiments of the present disclosure relate to a method to determine appropriate values of cyclic delays applied at a transmitter with multiple antennas in order to provide accurate estimation of channel gains in a multiple-input single-output (MISO) system or multiple-input multiple-output (MIMO) system.

74 Claims, 10 Drawing Sheets

(56) References Cited

U.S. PATENT DOCUMENTS

| | | | |
|---|---|---|---|
| 7,193,968 B1 | 3/2007 | Kapoor et al. | |
| 7,436,903 B2* | 10/2008 | Sandhu et al. | 375/315 |
| 7,450,546 B2 | 11/2008 | Lee et al. | |
| 7,583,633 B2 | 9/2009 | Woo et al. | |
| 7,654,151 B2 | 2/2010 | Agar et al. | |
| 7,660,275 B2 | 2/2010 | Vijayan et al. | |
| 7,738,356 B2* | 6/2010 | Kim | 370/208 |
| 7,813,320 B2 | 10/2010 | Kim et al. | |
| 7,948,907 B2 | 5/2011 | Wang et al. | |
| 7,965,686 B1 | 6/2011 | Bridge et al. | |
| 8,077,801 B2* | 12/2011 | Malladi | 370/335 |
| 8,108,895 B2 | 1/2012 | Anderson et al. | |
| 8,149,748 B2 | 4/2012 | Bata et al. | |
| 8,155,649 B2 | 4/2012 | McHenry et al. | |
| 8,189,501 B2 | 5/2012 | Eidenschink et al. | |
| 8,270,368 B2 | 9/2012 | Hirano et al. | |
| 2003/0067895 A1 | 4/2003 | Paneth et al. | |
| 2003/0187570 A1 | 10/2003 | Impson et al. | |
| 2003/0203735 A1 | 10/2003 | Andrus et al. | |
| 2004/0013089 A1 | 1/2004 | Taneja et al. | |
| 2004/0125769 A1 | 7/2004 | Vare | |
| 2004/0156347 A1 | 8/2004 | Kim | |
| 2004/0202140 A1 | 10/2004 | Kim et al. | |
| 2004/0203336 A1 | 10/2004 | Sinnarajah et al. | |
| 2004/0223561 A1* | 11/2004 | Tahat | 375/347 |
| 2004/0228304 A1 | 11/2004 | Riedel et al. | |
| 2004/0266426 A1 | 12/2004 | Marsh et al. | |
| 2005/0075084 A1 | 4/2005 | Salokannel et al. | |
| 2005/0090978 A1 | 4/2005 | Bathory et al. | |
| 2005/0195763 A1* | 9/2005 | Kadous et al. | 370/328 |
| 2005/0220106 A1 | 10/2005 | Raverdy et al. | |
| 2006/0013186 A1* | 1/2006 | Agrawal et al. | 370/344 |
| 2006/0052098 A1 | 3/2006 | Lee et al. | |
| 2006/0056344 A1 | 3/2006 | Roy et al. | |
| 2006/0109820 A1 | 5/2006 | Miyata | |
| 2006/0153133 A1 | 7/2006 | Zhong | |
| 2006/0168475 A1 | 7/2006 | Segers et al. | |
| 2006/0246887 A1 | 11/2006 | Barclay et al. | |
| 2006/0250937 A1 | 11/2006 | Wang et al. | |
| 2006/0252420 A1 | 11/2006 | Mantravadi et al. | |
| 2006/0268756 A1 | 11/2006 | Wang et al. | |
| 2007/0041344 A1 | 2/2007 | Yaqub et al. | |
| 2007/0064652 A1 | 3/2007 | Xu et al. | |
| 2007/0149240 A1 | 6/2007 | Brok | |
| 2007/0156379 A1 | 7/2007 | Kulkarni et al. | |
| 2007/0173256 A1 | 7/2007 | Laroia et al. | |
| 2007/0183444 A1 | 8/2007 | Schoettle | |
| 2007/0189404 A1 | 8/2007 | Baum et al. | |
| 2007/0202887 A1 | 8/2007 | Counts et al. | |
| 2007/0217383 A1 | 9/2007 | Mitani | |
| 2007/0232307 A1 | 10/2007 | Ibrahim et al. | |
| 2007/0291694 A1 | 12/2007 | Zhang | |
| 2008/0002611 A1 | 1/2008 | Walker et al. | |
| 2008/0025571 A1 | 1/2008 | Muramatsu et al. | |
| 2008/0049702 A1 | 2/2008 | Meylan et al. | |
| 2008/0102834 A1 | 5/2008 | Bernhard et al. | |
| 2008/0132264 A1 | 6/2008 | Krishnamurthy et al. | |
| 2008/0132282 A1* | 6/2008 | Liu et al. | 455/562.1 |
| 2008/0198763 A1 | 8/2008 | Fischer et al. | |
| 2008/0247364 A1* | 10/2008 | Kim et al. | 370/336 |
| 2008/0253287 A1 | 10/2008 | Gupta et al. | |
| 2008/0253331 A1 | 10/2008 | Gupta et al. | |
| 2008/0259894 A1 | 10/2008 | Gupta et al. | |
| 2008/0259911 A1 | 10/2008 | Gupta et al. | |
| 2008/0268844 A1 | 10/2008 | Ma et al. | |
| 2009/0005120 A1* | 1/2009 | Ylitalo | 455/562.1 |
| 2009/0010225 A1 | 1/2009 | Gupta | |
| 2009/0029705 A1 | 1/2009 | Gupta et al. | |
| 2009/0124210 A1* | 5/2009 | Imai et al. | 455/69 |
| 2009/0197604 A1 | 8/2009 | Gupta et al. | |
| 2009/0233602 A1 | 9/2009 | Hughes | |
| 2009/0274119 A1 | 11/2009 | Gupta et al. | |
| 2009/0304120 A1* | 12/2009 | Agrawal et al. | 375/340 |
| 2010/0046445 A1* | 2/2010 | Sawahashi et al. | 370/329 |
| 2011/0038350 A1 | 2/2011 | Gholmieh et al. | |
| 2012/0094692 A1 | 4/2012 | MacDonald et al. | |

FOREIGN PATENT DOCUMENTS

| | | |
|---|---|---|
| EP | 1758410 A2 | 2/2007 |
| EP | 1758423 A1 | 2/2007 |
| EP | 1773006 A1 | 4/2007 |
| JP | 10108267 A | 4/1998 |
| JP | 2004207922 A | 7/2004 |
| JP | 2005524366 A | 8/2005 |
| JP | 2006148836 A | 6/2006 |
| JP | 2006287959 A | 10/2006 |
| JP | 2006333243 A | 12/2006 |
| JP | 2007518380 A | 7/2007 |
| JP | 2008537395 A | 9/2008 |
| JP | 2009527142 A | 7/2009 |
| KR | 2005051865 A | 6/2005 |
| KR | 20050085570 A | 8/2005 |
| KR | 100895173 B1 | 5/2009 |
| RU | 2161869 C1 | 1/2001 |
| RU | 2002123921 A | 2/2004 |
| WO | WO0038463 A2 | 6/2000 |
| WO | WO0160106 A1 | 8/2001 |
| WO | WO0232160 | 4/2002 |
| WO | WO03073779 | 9/2003 |
| WO | WO2005117321 | 12/2005 |
| WO | WO2006102077 A1 | 9/2006 |
| WO | WO2006110445 A1 | 10/2006 |
| WO | WO2006110456 A1 | 10/2006 |
| WO | WO2007052768 A1 | 5/2007 |
| WO | 2008002823 A1 | 1/2008 |
| WO | WO2008157816 A2 | 12/2008 |

OTHER PUBLICATIONS

Koji Ishibashi et al: "Low Complexity Bit-Interleaved Coded DAPSK with Cyclic Delay Diversity" IEEE International Symposium on Personal, Indoor and Mobile Radio Communications. PIMRC, IEEE; PI, XX, Sep. 1, 2007, pp. 1-5, XP031168300 ISBN: 978-1-4244-1143-6 p. 3, right-hand column, last paragraph.

Roland Bless et al: "A quality-of-service signaling architecture for seamless handover support in next generation, IP-based mobile networks" Wireless Personal Communications, Kluwer Academic Publishers, DO, vol. 43, No. 3, Jun. 13, 2007, pp. 817-835, XP019557969 ISSN: 1572-834X paragraph [0003].

"Universal Mobile Telecommunications System (UMTS); Radio Resource Control (RRC); Protocol specification (3GPP TS 25.331 version 7.4.0 Release 7); ETSI TS 125 331" ETSI Standards, Lis, Sophia Antipolis Cedex, France, vol. 3-R2, No. V7.4.0, Mar. 1, 2007, XP014037920 ISSN: 0000-0001.

Maeda S., "4-5. Multichannel Broadcast Service for Cellular Phones: MediaFLO," Journal of the Institute of Image Information and Television Engineers, Japan, May 1, 2006, vol. 60, No. 5, pp. 725-727.

Taiwan Search Report—TW098108098—TIPO—Jun. 27, 2012.

* cited by examiner

METHODS AND SYSTEMS FOR CHOOSING CYCLIC DELAYS IN MULTIPLE ANTENNA OFDM SYSTEMS

CLAIM OF PRIORITY

This application claims benefit of priority from U.S. Provisional Patent Application Ser. No. 61/036,895, entitled "Method and apparatus for transmitting pilots from multiple antennas" and filed Mar. 14, 2008, which is fully incorporated herein by reference for all purposes.

TECHNICAL FIELD

Certain embodiments of the present disclosure generally relate to a wireless communication and, more particularly, to a method to choose appropriate values of cyclic delays for a multi-antenna transmission in order to accurately estimate channel gains.

SUMMARY

Certain embodiments provide a method of transmitting pilots in a wireless communication system. The method generally includes generating a first pilot for a first transmit antenna based on a first cyclic delay, and generating a second pilot for a second transmit antenna based on a second cyclic delay larger than the first cyclic delay by at least a cyclic prefix length.

Certain embodiments provide a method of performing channel estimation in a wireless communication system. The method generally includes obtaining first input samples comprising first and second pilots, the first pilot being generated based on a first cyclic delay and sent from a first transmit antenna, the second pilot being generated based on a second cyclic delay and sent from a second transmit antenna, the second cyclic delay being larger than the first cyclic delay by at least a cyclic prefix length, and the first input samples being from a first receive antenna, and processing the first input samples to obtain a first channel estimate for the first transmit antenna and a second channel estimate for the second transmit antenna.

Certain embodiments provide an apparatus for transmitting pilots in a wireless communication system. The apparatus generally includes logic for generating a first pilot for a first transmit antenna based on a first cyclic delay, and logic for generating a second pilot for a second transmit antenna based on a second cyclic delay larger than the first cyclic delay by at least a cyclic prefix length.

Certain embodiments provide an apparatus for performing channel estimation in a wireless communication system. The apparatus generally includes logic for obtaining first input samples comprising first and second pilots, the first pilot being generated based on a first cyclic delay and sent from a first transmit antenna, the second pilot being generated based on a second cyclic delay and sent from a second transmit antenna, the second cyclic delay being larger than the first cyclic delay by at least a cyclic prefix length, and the first input samples being from a first receive antenna, and logic for processing the first input samples to obtain a first channel estimate for the first transmit antenna and a second channel estimate for the second transmit antenna.

Certain embodiments provide an apparatus for transmitting pilots in a wireless communication system. The apparatus generally includes means for generating a first pilot for a first transmit antenna based on a first cyclic delay, and means for generating a second pilot for a second transmit antenna based on a second cyclic delay larger than the first cyclic delay by at least a cyclic prefix length.

Certain embodiments provide an apparatus for performing channel estimation in a wireless communication system. The apparatus generally includes means for obtaining first input samples comprising first and second pilots, the first pilot being generated based on a first cyclic delay and sent from a first transmit antenna, the second pilot being generated based on a second cyclic delay and sent from a second transmit antenna, the second cyclic delay being larger than the first cyclic delay by at least a cyclic prefix length, and the first input samples being from a first receive antenna, and means for processing the first input samples to obtain a first channel estimate for the first transmit antenna and a second channel estimate for the second transmit antenna.

Certain embodiments provide a computer-program product for transmitting pilots in a wireless communication system, comprising a computer readable medium having instructions stored thereon, the instructions being executable by one or more processors. The instructions generally include instructions for generating a first pilot for a first transmit antenna based on a first cyclic delay, and instructions for generating a second pilot for a second transmit antenna based on a second cyclic delay larger than the first cyclic delay by at least a cyclic prefix length.

Certain embodiments provide a computer-program product for performing channel estimation in a wireless communication system, comprising a computer readable medium having instructions stored thereon, the instructions being executable by one or more processors. The instructions generally include instructions for obtaining first input samples comprising first and second pilots, the first pilot being generated based on a first cyclic delay and sent from a first transmit antenna, the second pilot being generated based on a second cyclic delay and sent from a second transmit antenna, the second cyclic delay being larger than the first cyclic delay by at least a cyclic prefix length, and the first input samples being from a first receive antenna, and instructions for processing the first input samples to obtain a first channel estimate for the first transmit antenna and a second channel estimate for the second transmit antenna.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

The word "exemplary" is used herein to mean "serving as an example, instance, or illustration." Any embodiment described herein as "exemplary" is not necessarily to be construed as preferred or advantageous over other embodiments.

A Cyclic Delay Diversity (CDD) scheme can be applied for a multi-antenna Orthogonal Frequency Division Multiplexing (OFDM) transmission in order to provide higher frequency diversity and improve error rate performance. Multiple artificial channel paths can be generated by transmitting cyclically delayed data from a plurality of antennas. Estimation of channel gains associated with the plurality of transmit antennas can be performed at a receiver side using known pilot or training sequences. However, in certain cases, time domain channel paths cannot be fully separated at the receiver if cyclically delayed pilot sequences match path delays of a channel profile.

Exemplary Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. A SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One specific example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

IEEE 802.16 is an emerging standard organization to define an air interface for fixed and mobile broadband wireless access (BWA) systems. These standards define at least four different physical layers (PHYs) and one medium access control (MAC) layer. The OFDM and OFDMA physical layer of the four physical layers are the most popular in the fixed and mobile BWA areas respectively.

Figure 1:
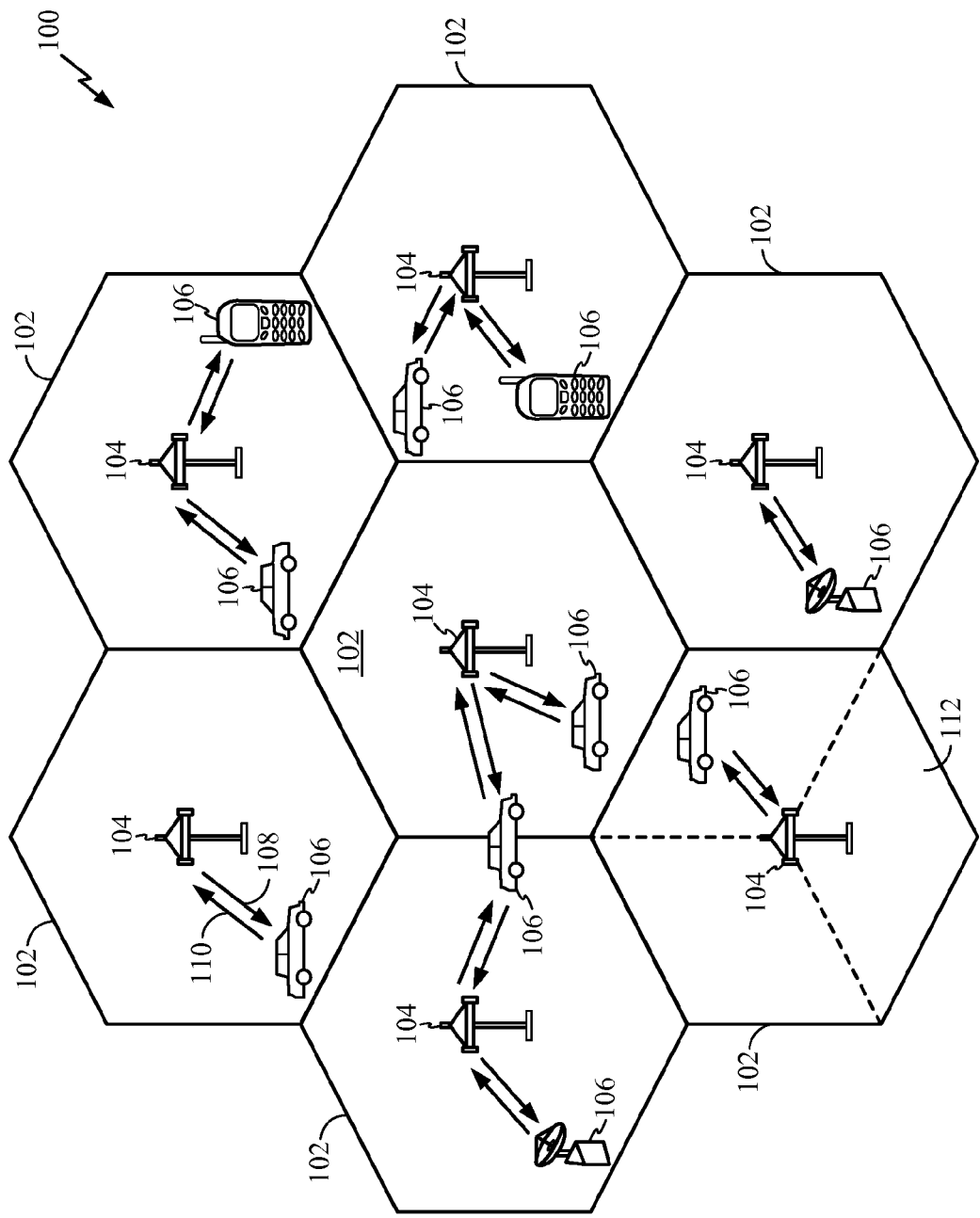
FIG. 1 illustrates an example wireless communication system, in accordance with certain embodiments of the present disclosure.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, subscriber stations, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink (DL) 108, and a communication link that facilitates transmission from a user terminal 106 to a base station 104 may be referred to as an uplink (UL) 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
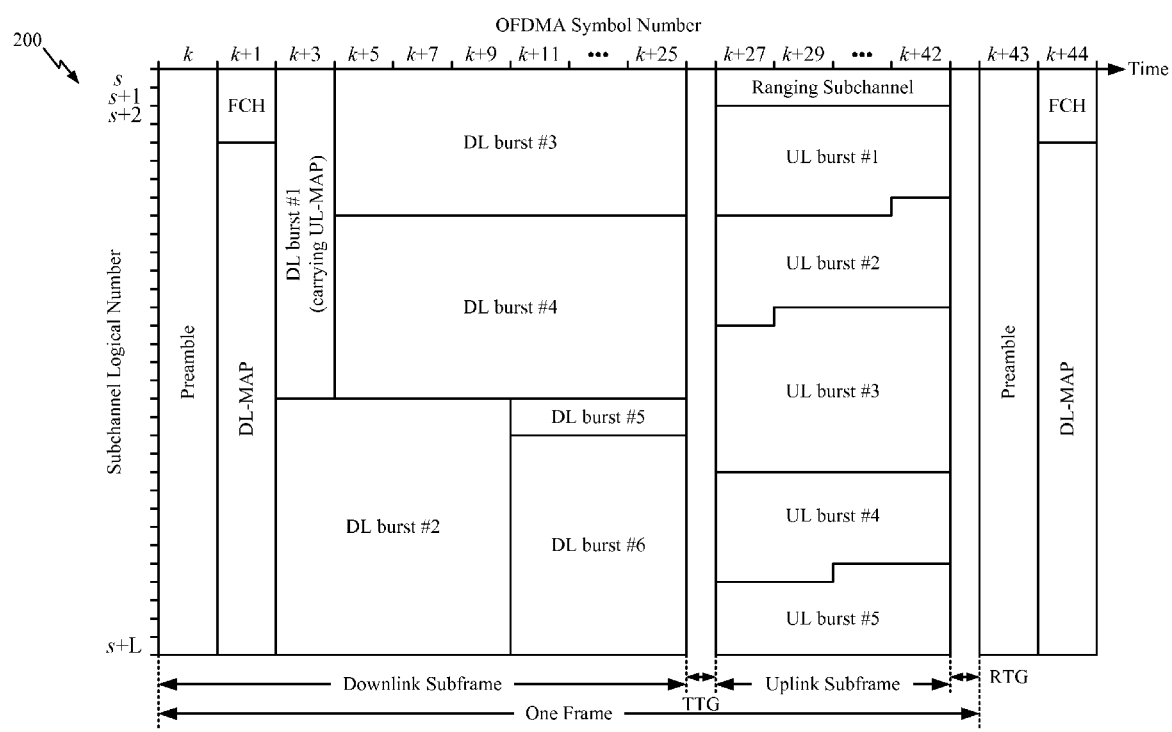
FIG. 2 illustrates an example Orthogonal Frequency Division Multiplexing/Orthogonal Frequency Division Multiple Access (OFDM/OFDMA) frame for Time Division Duplex (TDD) in accordance with certain embodiments of the present disclosure.

FIG. 2 shows an example frame structure 200 for a time division duplex (TDD) mode in IEEE 802.16. The transmission timeline may be partitioned into units of frames. Each frame may span predetermined time duration, e.g., 5 milliseconds (ms), and may be partitioned into a downlink subframe and an uplink subframe. In general, the downlink and uplink subframes may cover any fraction of a frame. The downlink and uplink subframes may be separated by a transmit transmission gap (TTG) and a receive transmission gap (RTG).

A number of physical subchannels may be defined. Each physical subchannel may include a set of subcarriers that may be contiguous or distributed across the system bandwidth. A number of logical subchannels may also be defined and may be mapped to the physical subchannels based on a known mapping. The logical subchannels may simplify the allocation of resources.

As shown in FIG. 2, a downlink subframe may include a preamble, a frame control header (FCH), a downlink map (DL-MAP), an uplink map (UL-MAP), and downlink (DL) bursts. The preamble may carry a known transmission that may be used by subscriber stations for frame detection and synchronization. The FCH may carry parameters used to receive the DL-MAP, the UL-MAP, and the downlink bursts. The DL-MAP may carry a DL-MAP message, which may include information elements (IEs) for various types of control information (e.g., resource allocation or assignment) for downlink access. The UL-MAP may carry a UL-MAP message, which may include IEs for various types of control information for uplink access. The downlink bursts may carry data for the subscriber stations being served. An uplink subframe may include uplink bursts, which may carry data transmitted by the subscriber stations scheduled for uplink transmission.

The pilot transmission techniques described herein may be used for multiple-input multiple-output (MIMO) transmission as well as multiple-input single-output transmission (MISO) transmission. The techniques may also be used for pilot transmission on the downlink as well as the uplink. For clarity, certain aspects of the techniques are described below for pilot transmission on the downlink with MIMO.

Figure 3:
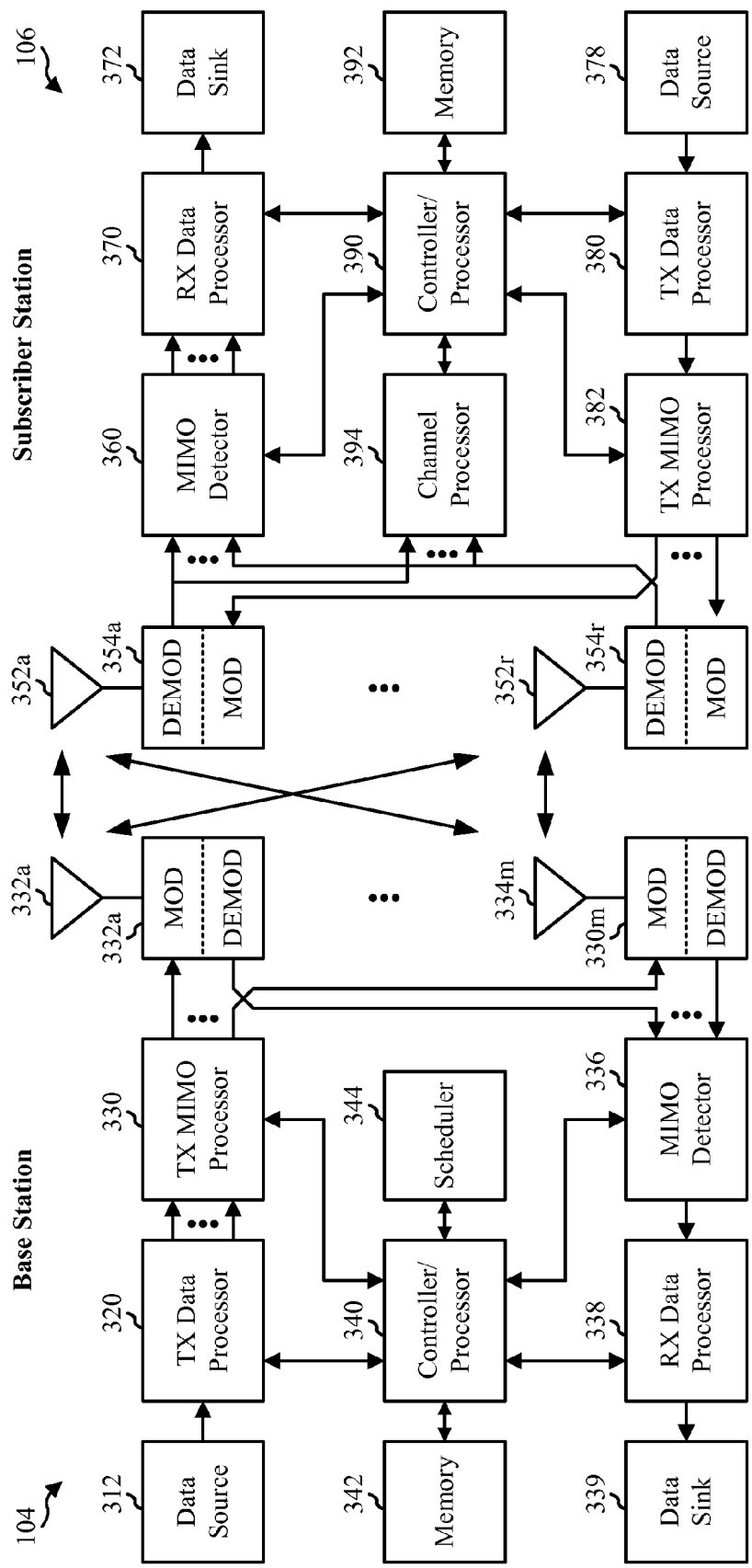
FIG. 3 illustrates an example transmitter and an example receiver that may be used within a wireless communication system in accordance with certain embodiments of the present disclosure.

FIG. 3 shows a block diagram of a design of a base station 104 and a subscriber station 106, which are one of the base stations and one of the subscriber stations in FIG. 1. Base station 104 is equipped with multiple (M) antennas 334a through 334m. Subscriber station 106 is equipped with multiple (R) antennas 352a through 352r.

At base station 104, a transmit (TX) data processor 320 may receive data from a data source 312, process (e.g., encode and symbol map) the data based on one or more modulation and coding schemes, and provide data symbols. As used herein, a data symbol is a symbol for data, a pilot symbol is a symbol for pilot, and a symbol may be a real or complex value. The data and pilot symbols may be modulation symbols from a modulation scheme such as PSK or QAM. Pilots may comprise data that is known a priori by both the base station and the subscriber station. A TX MIMO processor 330 may process the data and pilot symbols and provide M output symbol streams to M modulators (MOD) 332a through 332m. Each modulator 332 may process its output symbol stream (e.g., for OFDM) to obtain an output sample stream. Each modulator 332 may further condition (e.g., convert to analog, filter, amplify, and upconvert) its output sample stream and generate a downlink signal. M downlink signals from modulators 332a through 332m may be transmitted via antennas 334a through 334m, respectively.

At subscriber station 106, R antennas 352a through 352r may receive the M downlink signals from base station 104, and each antenna 352 may provide a received signal to an associated demodulator (DEMOD) 354. Each demodulator 354 may condition (e.g., filter, amplify, downconvert, and digitize) its received signal to obtain input samples and may further process the input samples (e.g., for OFDM) to obtain received symbols. Each demodulator 354 may provide received data symbols to a MIMO detector 360 and provide the received pilot symbols to a channel processor 394. Channel processor 394 may estimate the response of a MIMO channel from base station 104 to subscriber station 120 based on the received pilot symbols and provide a MIMO channel estimate to MIMO detector 360. MIMO detector 360 may perform MIMO detection on the received symbols based on the MIMO channel estimate and provide detected symbols, which are estimates of the transmitted data symbols. A receive (RX) data processor 370 may process (e.g., symbol de-mapping and decode) the detected symbols and provide decoded data to a data sink 372.

Subscriber station 106 may evaluate the channel conditions and generate feedback information, which may comprise various types of information. The feedback information and data from a data source 378 may be processed (e.g., encoded and symbol mapped) by a TX data processor 380, spatially processed by a TX MIMO processor 382, and further processed by modulators 354a through 354r to generate R uplink signals, which may be transmitted via antennas 352a through 352r. At base station 104, the R uplink signals from subscriber station 106 may be received by antennas 334a through 334m, processed by demodulators 332a through 332m, spatially processed by a MIMO detector 336, and further processed (e.g., symbol demapped and decoded) by an RX data processor 338 to recover the feedback information and data sent by subscriber station 106. Controller/processor 340 may control data transmission to subscriber station 106 based on the feedback information.

Controllers/processors 340 and 390 may direct the operation at base station 104 and subscriber station 106, respectively. Memories 342 and 392 may store data and program codes for base station 104 and subscriber station 106, respectively. A scheduler 344 may schedule subscriber station 106 and/or other subscriber stations for data transmission on the downlink and/or uplink based on the feedback information received from all subscriber stations.

IEEE 802.16 utilizes orthogonal frequency division multiplexing (OFDM) for the downlink and uplink. OFDM partitions the system bandwidth into multiple ($N_{FFT}$) orthogonal subcarriers, which may also be referred to as tones, bins, etc. Each subcarrier may be modulated with data or pilot. The number of subcarriers may be dependent on the system bandwidth as well as the frequency spacing between adjacent subcarriers. For example, $N_{FFT}$ may be equal to 128, 256, 512, 1024 or 2048. Only a subset of the $N_{FFT}$ total subcarriers may be usable for transmission of data and pilot, and the remaining subcarriers may serve as guard subcarriers to allow the system to meet spectral mask requirements. In the following description, a data subcarrier is a subcarrier used for data, and a pilot subcarrier is a subcarrier used for pilot. An OFDM symbol may be transmitted in each OFDM symbol period (or simply, a symbol period). Each OFDM symbol may include data subcarriers used to send data, pilot subcarriers used to send pilot, and/or guard subcarriers not used for data or pilot.

Figure 4:
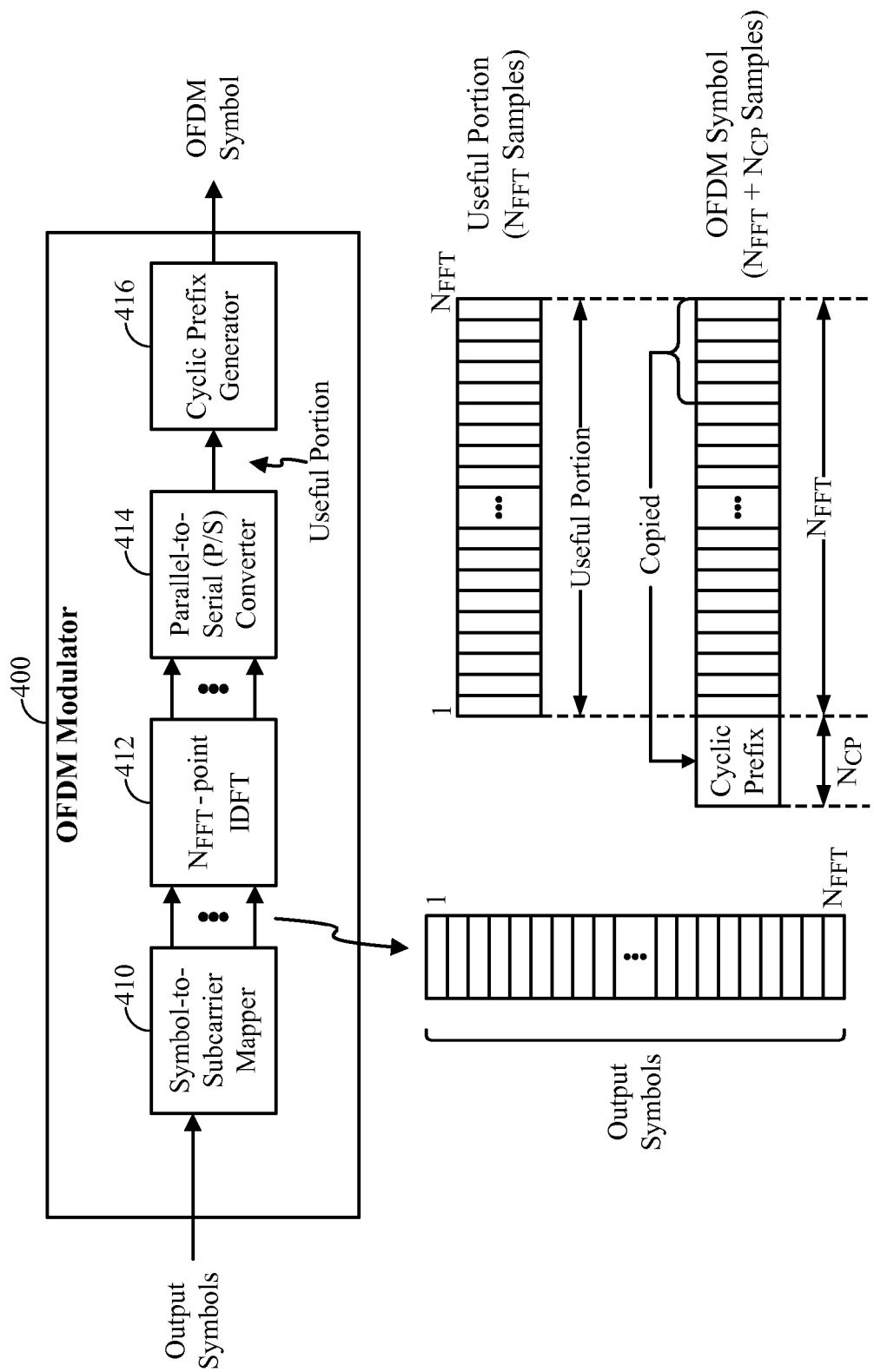
FIG. 4 illustrates a block diagram of a design of an OFDM modulator in accordance with certain embodiments of the present disclosure.

FIG. 4 shows a block diagram of a design of an OFDM modulator 400, which may be included in each of modulators 332a through 332m and modulators 354a through 354r in FIG. 3. Within OFDM modulator 400, a symbol-to-subcarrier mapper 410 receives and maps output symbols to the $N_{FFT}$ total subcarriers. In each OFDM symbol period, a unit 412 transforms $N_{FFT}$ output symbols for the $N_{FFT}$ total subcarriers to the time domain with an $N_{FFT}$-point inverse discrete Fourier transform (IDFT) and provides a useful portion containing $N_{FFT}$ time-domain samples. Each sample is a complex value to be transmitted in one chip period. A parallel-to-serial (P/S) converter 414 serializes the $N_{FFT}$ samples in the useful portion. A cyclic prefix generator 416 copies the last $N_{CP}$ samples of the useful portion and appends these $N_{CP}$ samples to the front of the useful portion to form an OFDM symbol containing $N_{FFT}+N_{CP}$ samples. Each OFDM symbol thus contains a useful portion of $N_{FFT}$ samples and a cyclic prefix of $N_{CP}$ samples. The cyclic prefix is used to combat intersymbol interference (ISI) and inter-carrier interference (ICI) caused by delay spread in a wireless channel.

Referring back to FIG. 3, on the downlink, a MIMO channel is formed by the M transmit antennas at base station 104 and the R receive antennas at subscriber station 106. This MIMO channel is composed of M·R single-input single-output (SISO) channels or one SISO channel for each possible pair of transmit and receive antennas. The channel response for each SISO channel may be characterized by either a time-domain channel impulse response or a corresponding frequency-domain channel frequency response. The channel frequency response is the discrete Fourier transform (DFT) of the channel impulse response.

The channel impulse response for each SISO channel may be characterized by L time-domain channel taps, where L is typically much less than $N_{FFT}$. That is, if an impulse is applied at a transmit antenna, then L time-domain samples at the sample rate taken at a receive antenna for this impulse stimulus would be sufficient to characterize the response of the SISO channel. The required number of channel taps (L) for the channel impulse response is dependent on the delay spread of the system, which is the time difference between the earliest and latest arriving signal instances of sufficient energy at the receive antenna.

Each SISO channel may include one or more propagation paths between the transmit antenna and the receive antenna for that SISO channel, with the propagation paths being determined by the wireless environment. Each path may be associated with a particular complex gain and a particular delay. For each SISO channel, the complex gains of the L channel taps are determined by complex gains of paths for that SISO channel. Each SISO channel thus has a channel profile with paths $d_0$ through $d_{L-1}$, where the complex gain of each path $d_l$ may be a zero or non-zero value.

Cyclic delay diversity (CDD) may be used to create frequency diversity in a MIMO transmission, which may improve error rate performance. With cyclic delay diversity, the OFDM symbols for each transmit antenna may be cyclically delayed by a different amount, as described below. M different cyclically delayed signals may be transmitted from the M transmit antennas. However, cyclic delay diversity may adversely impact MIMO channel estimation in some instances. In particular, it may not be possible to separate paths if a cyclically delayed signal matches a path delay in the channel profile. For example, for a given receive antenna, it may not be possible to determine whether a complex gain for a delay of two samples is from (i) a downlink signal from transmit antenna 0 with no cyclic delay and received via a path with a delay of two samples, or (ii) a downlink signal from transmit antenna 1 with a cyclic delay of one sample and received via a path with a delay of one sample, or (iii) a downlink signal from transmit antenna 2 with a cyclic delay of two samples and received via a path with no delay.

If the channel profile has paths $d_0$ through $d_{L-1}$ and if the M downlink signals from the M transmit antennas have cyclic delays of $t_0$ through $t_{M-1}$, then the L channel taps for each SISO channel can be determined without ambiguity if $(d_l+t_m)$ mod $T_S$ is distinct for all values of indices l and m, where $l=0,\ldots,L-1$, $m=0,\ldots,M-1$, $T_S$ is the duration of the useful portion and is equal to $N_{FFT}$ samples, and "mod" denotes a modulo operation. This condition is applicable for full frequency reuse.

For certain embodiments, the cyclic delay $t_m$ for each transmit antenna (except for one transmit antenna with cyclic delay of zero) may be selected to be equal to or greater than the maximum expected delay spread in the system. The cyclic prefix length $N_{CP}$ may be selected such that it is equal to or greater than the maximum expected delay spread in the system, so that $L \le N_{CP}$. Thus, for certain embodiments, the cyclic delay for each transmit antenna may be selected to be as follows:

$$t_m = \sum_{i=0}^{m} N_{C,i}, \text{ for } m = 0, 1, \ldots, M-1 \quad (1)$$

where $N_{C,0} \ge 0$, and $N_{C,i} \ge N_{CP} \; \forall i \ge 1$.

Figure 5:
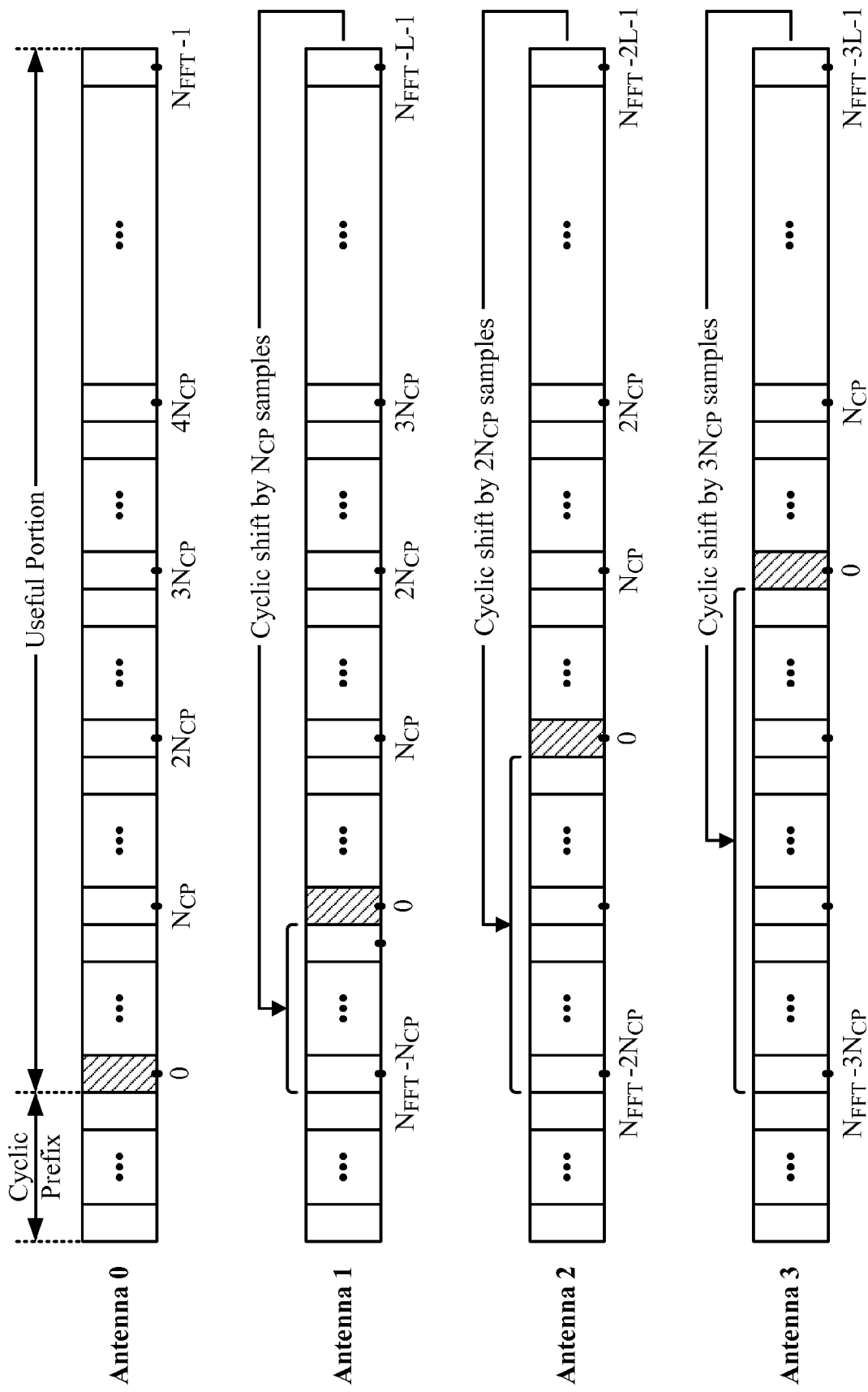
FIG. 5 illustrates an example of cyclic delay diversity in accordance with certain embodiments of the present disclosure.

FIG. 5 shows cyclic delay diversity for one exemplary case of equation (1) when $N_{C,0}=0$ and $N_{C,i}=N_{CP}$ for $i=1,\ldots,M-1$, with M=4 transmit antennas. Transmit antenna 0 has a cyclic delay of 0, and the useful portion is cyclically shifted/delayed by zero samples for this transmit antenna. Transmit antenna 1 has a cyclic delay of $N_{CP}$, and the useful portion is cyclically shifted by $N_{CP}$ samples for this transmit antenna. Transmit antenna 2 has a cyclic delay of $2 \cdot N_{CP}$, and the useful portion is cyclically shifted by $2 \cdot N_{CP}$ samples for this transmit antenna. Transmit antenna 3 has a cyclic delay of $3 \cdot N_{CP}$, and the useful portion is cyclically shifted by $3 \cdot N_{CP}$ samples for this transmit antenna.

Following equation (1), the cyclic delays for the M transmit antennas may be selected as:

$$t_{m+1} - t_m \ge N_{CP}, \text{ for } m=0,\ldots,M-2, \quad (2)$$

while $t_{M-1} \le N_{FFT} - N_{CP}$.

The design in equation (2) ensures that $d_l+t_m$ is distinct for all values of l and m. Channel estimation for all L paths from all M transmit antennas (which is referred to as complete channel estimation) may then be possible without ambiguity. If the cyclic delays for the M transmit antennas are standardized or known a priori, then there is no need to explicitly send signaling for the cyclic delays.

Base station 104 may transmit pilot symbols from the M transmit antennas in a manner to facilitate complete channel estimation by subscriber station 106. The pilot symbols may be sent on S subcarriers $k_0$ through $k_{S-1}$, where in general $S \le N_{FFT}$. The S pilot subcarriers may be determined as described below.

A set of $$Q = \sum_{m=0}^{M-1} N_{C,m}$$

coefficients may be defined as follows:

$$b_q = e^{-j2\pi \cdot (d_l+t_m)/T_S}, \quad (3)$$

where $l=0,\ldots,N_{C,m}-1$, for $m=0,\ldots,M-1$, and $N_{C,m} \ge N_{CP}$, $q=l \cdot M+m=0,\ldots,Q-1$, and $b_q$ is the qth coefficient in the set. Since $L \le N_{CP}$, there may be fewer than $N_{CP}$ channel taps. A thresholding may be used to zero out channel taps that are not present.

An S×Q matrix B may be defined for the S pilot subcarriers as follows:

$$B = \begin{bmatrix} b_0^{k_0} & b_1^{k_0} & b_2^{k_0} & \cdots & b_{Q-1}^{k_0} \\ b_0^{k_1} & b_1^{k_1} & b_2^{k_1} & \cdots & b_{Q-1}^{k_1} \\ b_0^{k_2} & b_1^{k_2} & b_2^{k_2} & \cdots & b_{Q-1}^{k_2} \\ \vdots & \vdots & \vdots & \ddots & \vdots \\ b_0^{k_{S-1}} & b_1^{k_{S-1}} & b_2^{k_{S-1}} & \cdots & b_{Q-1}^{k_{S-1}} \end{bmatrix}, \quad (4)$$

where $b_{i,q} = b_q^{k_i}$ is an element in the ith row and qth column of matrix B, with $i=0,\ldots,S-1$ and $q=0,\ldots,Q-1$.

A sufficient condition for complete channel estimation is that the rank of matrix B is equal to L·M. This leads to a necessary condition that $b_q$ be distinct, which means that $d_l + t_m$ should be distinct up to modulo $T_S$.

The system may operate with full frequency reuse, and each cell may transmit on all $N_{FFT}$ total subcarriers (except for guard subcarriers). For full frequency reuse, pilot symbols may be sent on each subcarrier usable for transmission, or $S = N_{FFT}$, and matrix B may be an S×S Vandermonde matrix V having the following form:

$$V = \begin{bmatrix} 1 & 1 & 1 & \cdots & 1 \\ \alpha_0 & \alpha_1 & \alpha_2 & \cdots & \alpha_{S-1} \\ \alpha_0^2 & \alpha_1^2 & \alpha_2^2 & \cdots & \alpha_{S-1}^2 \\ \vdots & \vdots & \vdots & \ddots & \vdots \\ \alpha_0^{S-1} & \alpha_1^{S-1} & \alpha_2^{S-1} & \cdots & \alpha_{S-1}^{S-1} \end{bmatrix}. \quad (5)$$

For full frequency reuse, the necessary condition of distinct $b_q$ is sufficient to allow for complete channel estimation. Even if some subcarriers are reserved for guard but all other subcarriers are used and there are more than Q such subcarriers, then the matrix V will be full rank.

The system may operate with partial frequency reuse, and each cell may transmit on a subset of the $N_{FFT}$ total subcarriers. For example, with partial frequency reuse factor of 3, each cell may transmit on approximately one third of the $N_{FFT}$ total subcarriers. For partial frequency reuse, pilot symbols may be sent on a subset of the $N_{FFT}$ total subcarriers, matrix B may be a submatrix of the Vandermonde matrix, and the necessary condition of distinct $b_q$ may not be sufficient. However, the S pilot subcarriers $k_0$ through $k_{S-1}$ may be selected such that the necessary condition becomes sufficient for complete channel estimation.

For certain embodiments, the S pilot subcarriers may be spaced apart by p subcarriers, where p is a prime number that does not divide $N_{FFT}$. The pilot subcarriers may be selected as follows:

$$k_i = i \cdot p, \text{ for } i=0,\ldots,S-1, \quad (6)$$

where $k_i$ is an index of the ith pilot subcarrier, $S = \lfloor N_{FFT}/p \rfloor$ and "$\lfloor \ \rfloor$" denotes a floor operator.

Figure 6:
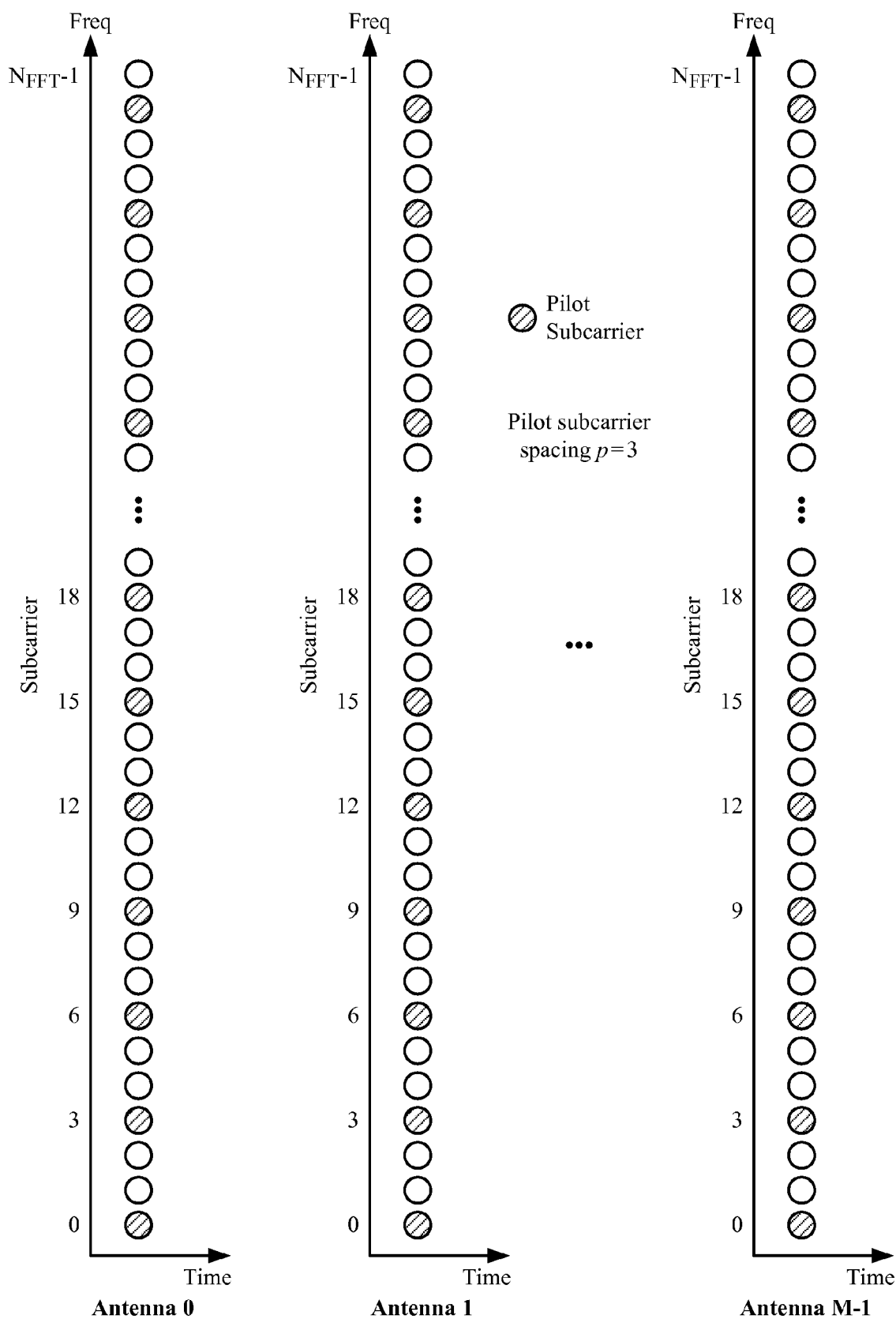
FIG. 6 illustrates an example pilot subcarrier structure for one OFDM symbol in accordance with certain embodiments of the present disclosure.

FIG. 6 shows an example pilot subcarrier structure for one OFDM symbol n for the design shown in equation (6). In this example, p=3 and the pilot subcarriers are spaced apart by three subcarriers. Pilot symbols may be sent on subcarriers 0, 3, 6, etc. The same set of pilot subcarriers may be used for each of the M transmit antennas, as shown in FIG. 6. The OFDM symbol with the pilot subcarriers may be for the preamble shown in FIG. 2 or some other OFDM symbol.

For the design shown in equation (6), matrix B is the same as the first Q columns of an S×S Vandermonde matrix formed with elements $\alpha_q = b_q^p$, for $q=0,\ldots,Q-1$, and with elements for the Qth to Sth columns formed with any elements that are all different from each of the $b_q^p$ elements. Complete channel estimation may then be possible with the following conditions:

1. $p \cdot (d_l + t_m) \bmod N_{FFT}$ should be distinct for all values of l and m, and
2. The number of rows S in matrix B should be equal to or greater than the number of columns Q in matrix B, or $S \geq Q$.

The two conditions above may be satisfied if p is a prime number that does not divide $N_{FFT}$ and $N_{FFT}/p \geq Q$, regardless of the cyclic prefix length L. However, the maximum value of $N_{CP}$ ($N_{CP,max}$) may be limited by the total number of subcarriers ($N_{FFT}$), the number of transmit antennas (M), and the pilot subcarrier spacing (p), as follows:

$$N_{CP,max} = \left\lfloor \frac{N_{FFT}}{p \cdot M} \right\rfloor. \quad (7)$$

For example, $N_{CP,max}=170$ for a case with M=2, $N_{FFT}=1024$ and p=3. A cyclic prefix length of 128 may be selected for this example. As another example, $N_{CP,max}=85$ for a case with M=2, $N_{FFT}=1024$ and p=3. A cyclic prefix length of 64 may be selected for this example. As yet another example, $N_{CP,max}=102$ for a case with M=2, $N_{FFT}=1024$ and p=5 for a lower reuse factor. A cyclic prefix length of 64 may be selected for this example.

The pilot subcarrier spacing may be selected based on cyclic delay lengths applied on M transmit antennas and the total number of subcarriers $N_{FFT}$, as follows:

$$p \leq \frac{N_{FFT}}{\sum_{m=0}^{M-1} N_{C,m}}. \quad (8)$$

Figure 7:
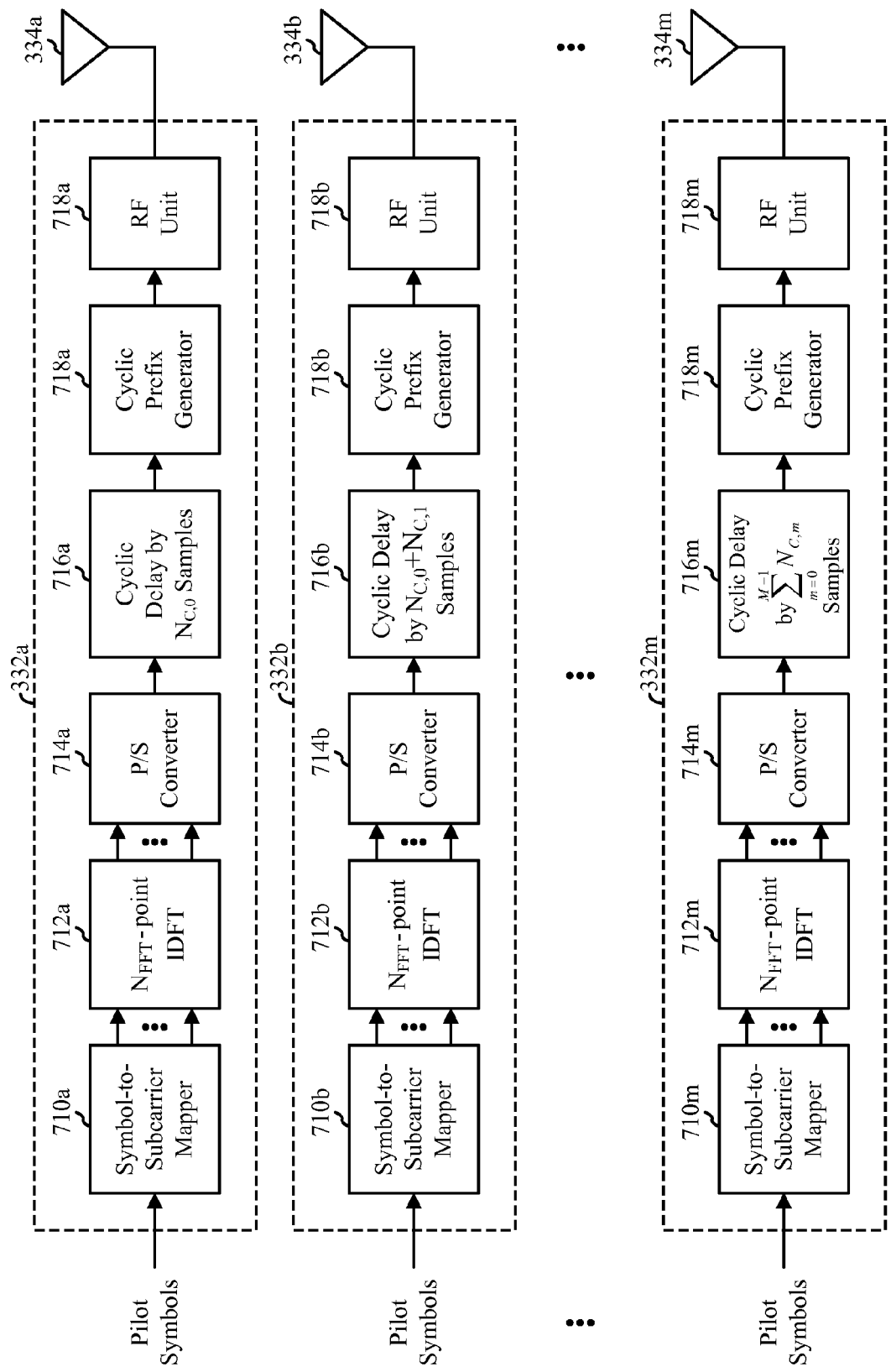
FIG. 7 illustrates a block diagram of a design of modulators at a base station in FIG. 3 in accordance with certain embodiments of the present disclosure.

FIG. 7 shows a block diagram of a design of modulators 332a through 332m at base station 104 in FIG. 3. For simplicity, FIG. 7 shows only the processing to generate pilots for the M transmit antennas. Within modulator 332a for transmit antenna 0, a symbol-to-subcarrier mapper 710a maps pilot symbols to pilot subcarriers (e.g., determined as shown in equation (6)) and maps zero symbols to remaining subcarriers. An IDFT unit 712a performs an $N_{FFT}$-point IDFT on the $N_{FFT}$ pilot and zero symbols and provides $N_{FFT}$ time-domain samples. A P/S converter 714a serializes the $N_{FFT}$ samples. For certain embodiments, a cyclic delay unit 716a cyclically shifts the $N_{FFT}$ samples by $N_{C,0}$ samples for transmit antenna 0. A cyclic prefix generator 718a appends a cyclic prefix and provides an OFDM symbol comprising a first pilot for transmit antenna 0.

Modulator 332b may similarly generate an OFDM symbol comprising a second pilot for transmit antenna 1. However, a cyclic delay unit 716b cyclically shifts the $N_{FFT}$ samples by $N_{C,0} + N_{C,1} \geq N_{CP}$ samples for transmit antenna 1. Each remaining modulator 332 may similarly generate an OFDM symbol comprising a pilot for its transmit antenna but may cyclically shift the $N_{FFT}$ samples by $$\sum_{i=0}^{m} N_{C,i}$$

samples for transmit antenna m, where $m=0,1,\ldots,M-1$.

Figure 8:
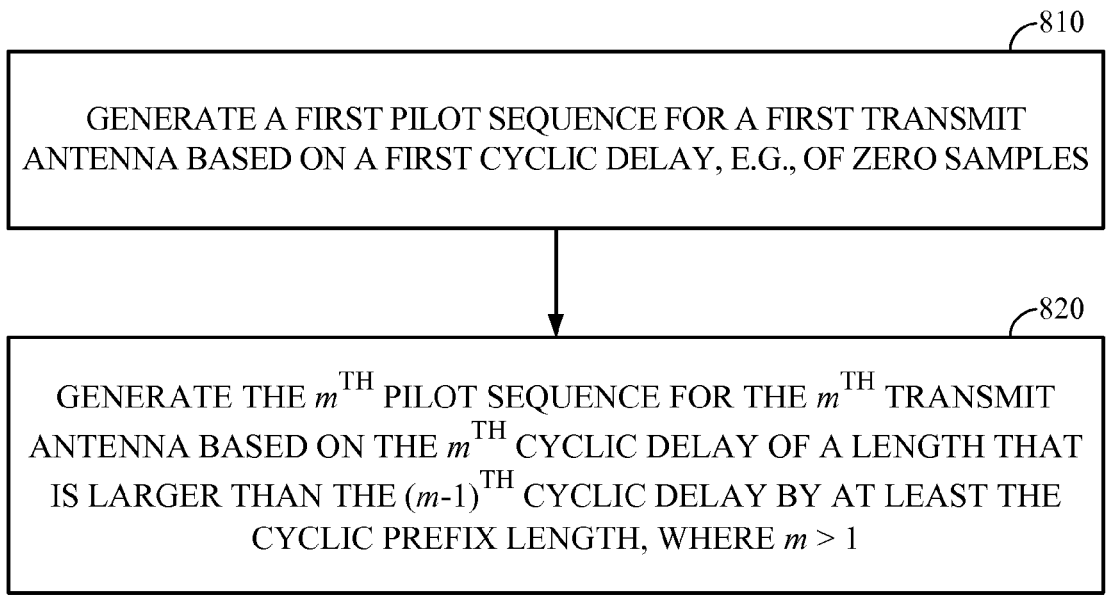
FIG. 8 illustrates a process for generating pilots for multiple-input single-output (MISO) or multiple-input multiple-output (MIMO) systems in accordance with certain embodiments of the present disclosure.

FIG. 8 shows a design of a process 800 for generating pilots for MISO or MIMO systems. Process 800 may be performed by base station 104 for pilot transmission on the downlink, by subscriber station 106 for pilot transmission on the uplink, or by some other entity.

At 810, a first pilot for a first transmit antenna may be generated based on a first cyclic delay, e.g., of zero samples. At 820, an mth pilot sequence may be generated for an mth transmit antenna based on an mth cyclic delay of a length that is larger than an (m−1)th cyclic delay length by at least the cyclic prefix length $N_{CP}$, where m>1. For certain embodiments, the cyclic delay for each transmit antenna is given as shown by equation (1), where $N_{C,0}=0$ and $N_{C,m}=m \cdot N_{CP}$, ∀m=1, . . . ,M−1. Additional pilots for additional transmit antennas may be generated based on suitable cyclic delays.

At 810, a first sample sequence comprising the first pilot may be generated and cyclically delayed by the first cyclic delay. A first OFDM symbol comprising the first pilot and having the first cyclic delay may be generated based on the cyclically delayed first sample sequence. At 820, the mth sample sequence comprising the mth pilot may be generated and cyclically delayed by the mth cyclic delay, where m>1. The mth OFDM symbol comprising the mth pilot and having the mth cyclic delay may be generated based on the cyclically delayed mth sample sequence, where m>1. For the first OFDM symbol, pilot symbols may be mapped to subcarriers spaced apart by p, where p may be a prime number that does not divide $N_{FFT}$. For the mth OFDM symbol, pilot symbols may be mapped to subcarriers spaced apart by p, where m>1. The same set of pilot subcarriers may be used for all OFDM symbols. The number of pilot subcarriers (S) may be equal to or greater than $M \cdot N_{CP}$. The pilot subcarrier spacing (p) may be selected as shown in equation (8).

Subscriber station 106 may derive a channel estimate for each of the M·R SISO channels in the MIMO channel between base station 104 and subscriber station 106. For each receive antenna, subscriber station 106 may obtain S received pilot symbols from the S pilot subcarriers and may remove the pilot modulation to obtain S observations for the S pilot subcarriers. The S observations for each receive antenna j may be expressed as:

$$y_j = Bh_j + n, \quad (9)$$

where $y_j$ is an S×1 vector of observations for the S pilot subcarriers on receive antenna j, B is an S×Q matrix defined in equation (4), $h_j$ is a Q×1 vector of channel gains for the M transmit antennas, and n is a S×1 noise vector.

Vector $h_j$ includes $$Q = \sum_{m=0}^{M-1} N_{C,m}$$

elements $h_{j,0}$ through $h_{j,Q-1}$. The first $N_{C,0} \geq N_{CP}$ elements $h_{j,0}$ through $h_{j,N_{C,0}-1}$ are channel gains for transmit antenna 0, the next $N_{C,1} \geq N_{CP}$ elements $h_{j,N_{C,0}}$ through $h_{j,N_{C,0}+N_{C,1}-1}$ are channel gains for transmit antenna 1, and so on, and the last $N_{C,M-1} \geq N_{CP}$ elements $h_{j,Q-N_{C,M-1}}$ through $h_{j,Q-1}$ are channel gains for transmit antenna M−1. An estimate of $h_j$ may be obtained from $y_j$ based on various techniques. In one design, an estimate of $h_j$ may be obtained from $y_j$ based such as a minimum mean square error (MMSE) technique, as follows:

$$\hat{h}_j = D[B^H B + \sigma_n^2 I]^{-1} B^H y_j, \quad (10)$$

where $D = \text{diag}\{[B^H B + \sigma_n^2 I]^{-1} B^H B\}^{-1}$, and $\hat{h}_j$ is an estimate of $h_j$.

The same processing may be performed for each receive antenna to obtain M channel estimates for M SISO channels between the M transmit antennas and that receive antenna.

Figure 9:
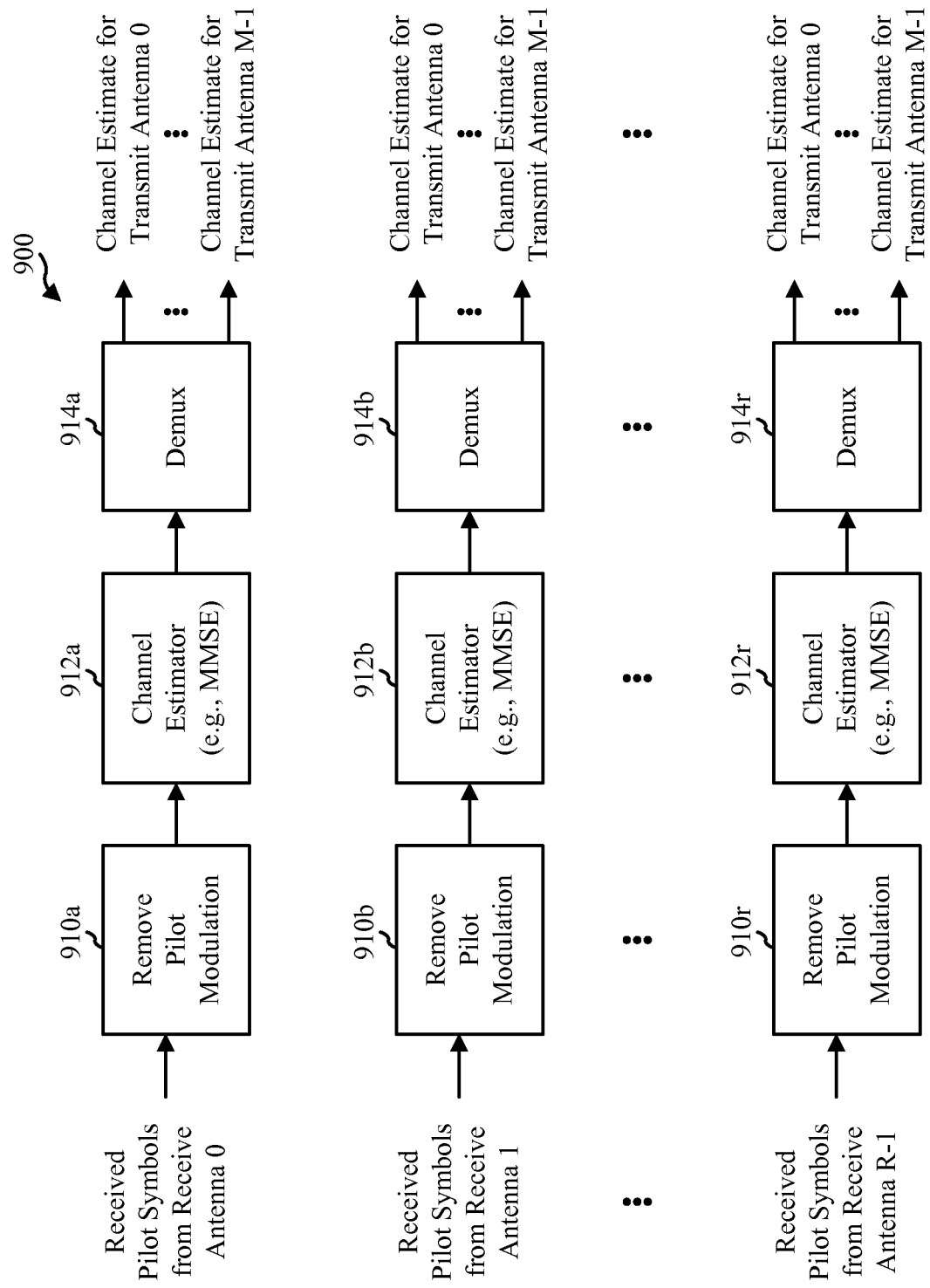
FIG. 9 illustrates a block diagram of a design of a channel estimator in accordance with certain embodiments of the present disclosure.

FIG. 9 shows a block diagram of a design of a channel estimator 900. Within channel estimator 900, R units 910a through 910r obtain S received pilot symbols for the S pilot subcarriers from R receive antennas 0 through R−1, respectively. Each unit 910 removes the pilot modulation on the S received pilot symbols from its receive antenna and provides S observations. The pilot modulation removal may be achieved by multiplying each received pilot symbol with a complex conjugate of the transmitted pilot symbol. R channel estimators 912a through 912r receive the S observations from units 910a through 910r, respectively. Each channel estimator 912 derives an estimate of $h_j$ for its receive antenna j, e.g., as shown in equation (10), and provides $\hat{h}_j$. R demultiplexers (Demux) 914a through 914r receive $\hat{h}_j$ from channel estimators 912a through 912r, respectively. Each demultiplexer 914 demultiplexes the channel gains in $\hat{h}_j$ and provides M channel estimates for the M transmit antennas.

Figure 10:
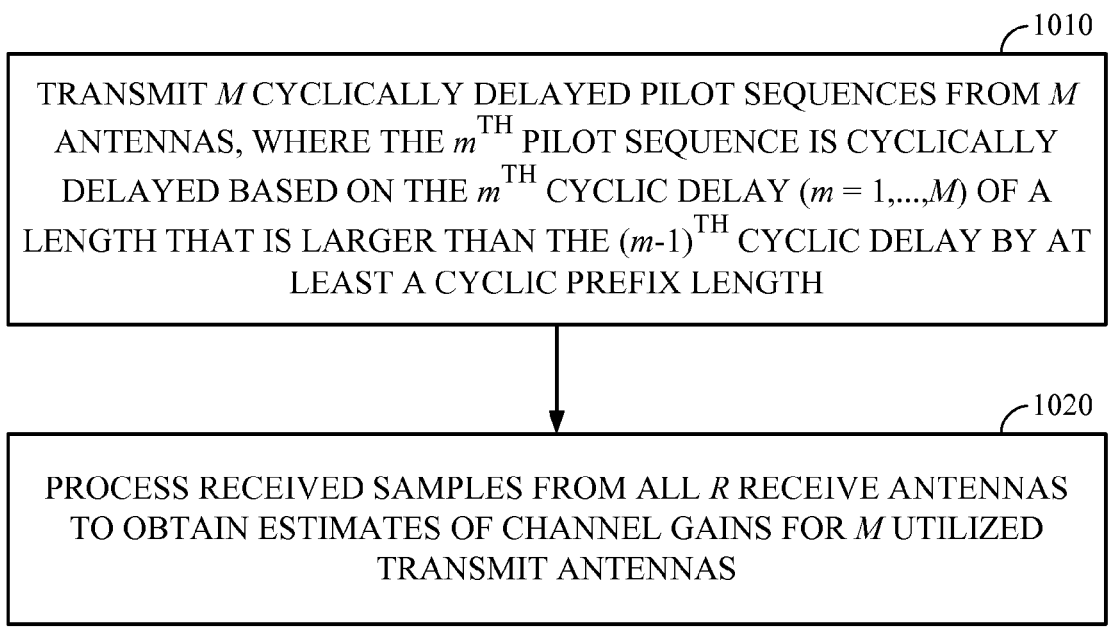
FIG. 10 illustrates a process for performing channel estimation in MISO or MIMO systems in accordance with certain embodiments of the present disclosure.

FIG. 10 shows a design of a process 1000 for performing channel estimation for MISO or MIMO systems. Process 1000 may be performed by subscriber station 106 for downlink channel estimation, by base station 104 for uplink channel estimation, or by some other entity. At 1010, M cyclically delayed pilot sequences may be transmitted from M transmit antennas, where the mth pilot sequence is cyclically delayed based on the mth cyclic delay (m=1, . . . ,M) of a length that is larger than the (m−1)th cyclic delay length by at least a cyclic prefix length $N_{CP}$.

At 1020, received samples may be processed for all R receive antennas to obtain estimates channel gains for M utilized transmit antennas. In general, received samples may be obtained from any number of receive antennas and processed to obtain channel estimates for any number of transmit antennas for each receive antenna. At 1020, the received samples may be processed to obtain observations for pilot subcarriers, e.g., by (i) performing OFDM demodulation on the received samples to obtain received pilot symbols for the pilot subcarriers and (ii) removing pilot modulation from the received pilot symbols to obtain the observations for the pilot subcarriers. The observations may be processed (e.g., based on the MMSE technique as shown in equation (10)) to obtain channel estimates for all utilized transmit antennas.

Figure 8A:
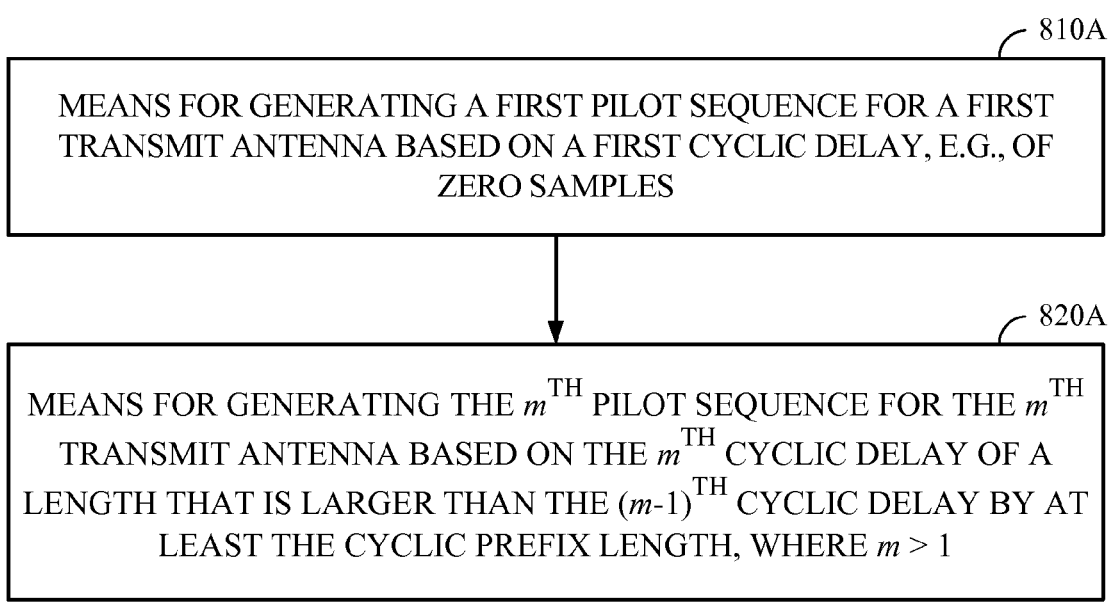
FIG. 8A illustrates example components capable of performing the operations illustrated in FIG. 8.
Figure 10A:
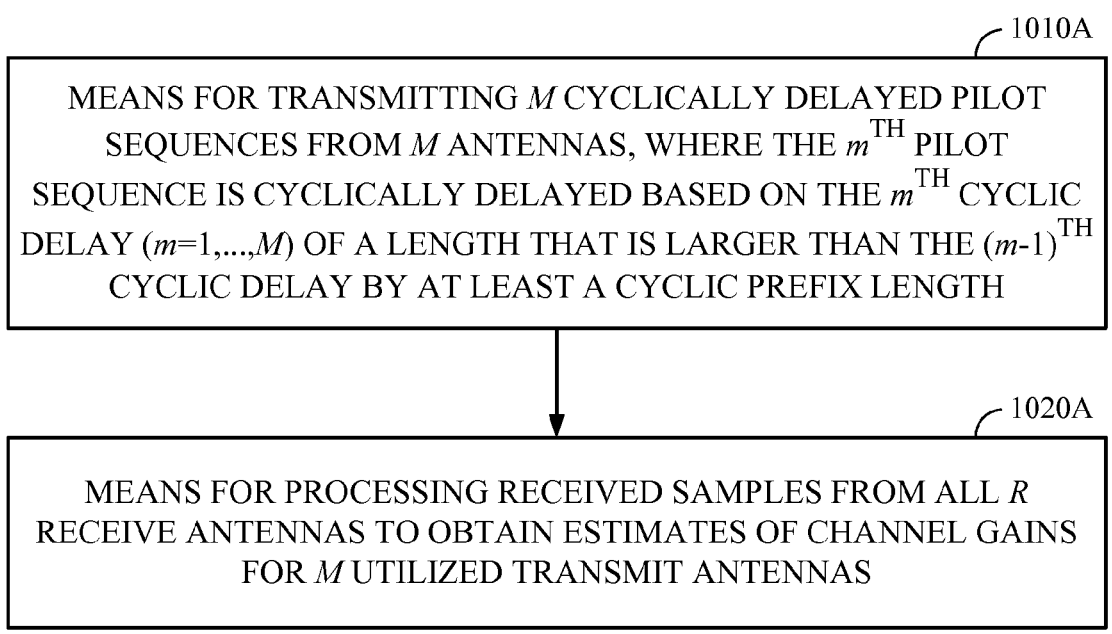
FIG. 10A illustrates example components capable of performing the operations illustrated in FIG. 10.

The various operations of methods described above may be performed by various hardware and/or software component(s) and/or module(s) corresponding to means-plus-function blocks illustrated in the Figures. For example, blocks 810-820 illustrated in FIG. 8 correspond to means-plus-function blocks 810A-820A illustrated in FIG. 8A. Similarly, blocks 1010-1020 illustrated in FIG. 10 correspond to means-plus-function blocks 1010A-1020A illustrated in FIG. 10A. More generally, where there are methods illustrated in Figures having corresponding counterpart means-plus-function Figures, the operation blocks correspond to means-plus-function blocks with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of transmitting pilots in a wireless communication system, comprising:
   generating a first pilot for a first transmit antenna based on a first cyclic delay; and
   generating a second pilot for a second transmit antenna based on a second cyclic delay larger than the first cyclic delay by at least a cyclic prefix length,
   wherein generating the first pilot and the second pilot comprises generating OFDM symbols that comprise pilot symbols mapped to subcarriers spaced apart by p, where p is a prime number that does not divide $N_{FFT}$, and $N_{FFT}$ is an FFT size for the generated OFDM symbols.

2. The method of claim 1, further comprising:
   generating a third pilot for a third transmit antenna based on a third cyclic delay larger than the second cyclic delay by at least the cyclic prefix length.

3. The method of claim 1, wherein the cyclic delay for each transmit antenna is $$t_m = \sum_{i=0}^{m} N_{C,i},$$

for m=0,1, . . . ,M−1,
   where $N_{C,0} \geq 0$, $N_{C,i} \geq N_{CP}$ $\forall i \geq 1$, $N_{CP}$ is the cyclic prefix length, m is a transmit antenna index, and $t_m$ is the cyclic delay for transmit antenna m, for m=0,1, . . . ,M−1.

4. The method of claim 1, wherein the first cyclic delay is zero and the second cyclic delay is equal to or greater than the cyclic prefix length.

5. The method of claim 1, wherein the first and second cyclic delays are not sent by signaling.

6. The method of claim 1, wherein:
   generating the first pilot further comprises generating a first sample sequence comprising the first pilot and cyclically delaying the first sample sequence by the first cyclic delay; and
   generating the second pilot further comprises generating a second sample sequence comprising the second pilot and cyclically delaying the second sample sequence by the second cyclic delay.

7. The method of claim 1, wherein the generated OFDM symbols comprise a first OFDM symbol comprising the first pilot and having the first cyclic delay and a second OFDM symbol comprising the second pilot and having the second cyclic delay.

8. The method of claim 7, wherein the pilot symbols are mapped to the same set of subcarriers for both the first and second OFDM symbols.

9. The method of claim 7, wherein:

$$S \geq \sum_{i=0}^{M-1} N_{C,i},$$

where S is number of subcarriers with pilot symbols, M is number of transmit antennas, and $$\sum_{i=0}^{m} N_{C,i}$$

is the length of cyclic delay for transmit antenna m, for m=0, . . . ,M−1.

10. The method of claim 7, wherein $$p \le \frac{N_{FFT}}{\sum_{i=0}^{M-1} N_{C,i}},$$

where M is a number of transit antennas and $$\sum_{i=0}^{m} N_{C,i}$$

is the length of cyclic delay for transmit antenna m, for m=0, . . . , M−1.

11. The method of claim 1, further comprising:
delaying OFDM pilot symbols transmitted from each antenna by a different amount to create frequency diversity.

12. The method of claim 11, further comprising:
performing channel estimation within a Multiple Input Multiple Output (MIMO) system based on the delayed OFDM pilot symbols.

13. A method of performing channel estimation in a wireless communication system, comprising:
obtaining first input samples comprising first and second pilots, the first pilot being generated based on a first cyclic delay and sent from a first transmit antenna, the second pilot being generated based on a second cyclic delay and sent from a second transmit antenna, the second cyclic delay being larger than the first cyclic delay by at least a cyclic prefix length, and the first input samples being from a first receive antenna; and
processing the first input samples based on pilot subcarriers spaced apart by p to obtain a first channel estimate for the first transmit antenna and a second channel estimate for the second transmit antenna, where p is a prime number that does not divide $N_{FFT}$, and $N_{FFT}$ is an FFT size for an OFDM symbol.

14. The method of claim 13, further comprising:
obtaining second input samples comprising the first and second pilots, the second input samples being from a second receive antenna; and
processing the second input samples to obtain a third channel estimate for the first transmit antenna and a fourth channel estimate for the second transmit antenna.

15. The method of claim 14, wherein the processing the second input samples comprises:
processing the second input samples to obtain observations for the pilot subcarriers; and
processing the observations to obtain the third and fourth channel estimates.

16. The method of claim 15, wherein the processing the second input samples to obtain observations comprises:
performing OFDM demodulation on the second input samples to obtain received pilot symbols for the pilot subcarriers; and
removing pilot modulation from the received pilot symbols to obtain the observations for the pilot subcarriers.

17. The method of claim 15, wherein the processing the observations comprises processing the observations based on a minimum mean square error (MMSE) technique to obtain the third and fourth channel estimates.

18. The method of claim 13, wherein the processing the first input samples comprises:
processing the first input samples to obtain observations for the pilot subcarriers; and
processing the observations to obtain the first and second channel estimates.

19. The method of claim 18, wherein the processing the second input samples to obtain observations comprises:
performing OFDM demodulation on the first input samples to obtain received pilot symbols for the pilot subcarriers; and
removing pilot modulation from the received pilot symbols to obtain the observations for the pilot subcarriers.

20. The method of claim 18, wherein the processing the observations comprises processing the observations based on a minimum mean square error (MMSE) technique to obtain the first and second channel estimates.

21. An apparatus for transmitting pilots in a wireless communication system, comprising:
logic for generating a first pilot for a first transmit antenna based on a first cyclic delay; and
logic for generating a second pilot for a second transmit antenna based on a second cyclic delay larger than the first cyclic delay by at least a cyclic prefix length,
wherein the logic for generating the first pilot and the logic for generating the second pilot comprise logic for generating OFDM symbols that comprise pilot symbols mapped to subcarriers spaced apart by p, where p is a prime number that does not divide $N_{FFT}$, and $N_{FFT}$ is an FFT size for the generated OFDM symbols.

22. The apparatus of claim 21, further comprising:
logic for generating a third pilot for a third transmit antenna based on a third cyclic delay larger than the second cyclic delay by at least the cyclic prefix length.

23. The apparatus of claim 21, wherein the cyclic delay for each transmit antenna is $$t_m = \sum_{i=0}^{m} N_{C,i},$$

for m=0,1, . . . ,M−1,
where $N_{C,0} \ge 0$, $N_{C,i} \ge N_{CP}$ $\forall i \ge 1$, $N_{CP}$ is the cyclic prefix length, m is a transmit antenna index, and $t_m$ is the cyclic delay for transmit antenna m, for m=0,1, . . . ,M−1.

24. The apparatus of claim 21, wherein the first cyclic delay is zero and the second cyclic delay is equal to or greater than the cyclic prefix length.

25. The apparatus of claim 21, wherein the first and second cyclic delays are not sent by signaling.

26. The apparatus of claim 21, wherein:
the logic for generating the first pilot further comprises logic for generating a first sample sequence comprising the first pilot and cyclically delaying the first sample sequence by the first cyclic delay; and
the logic for generating the second pilot further comprises logic for generating a second sample sequence comprising the second pilot and cyclically delaying the second sample sequence by the second cyclic delay.

27. The apparatus of claim 21, wherein the generated OFDM symbols comprise a first OFDM symbol comprising the first pilot and having the first cyclic delay and a second OFDM symbol comprising the second pilot and having the second cyclic delay.

28. The apparatus of claim 27, wherein the pilot symbols are mapped to the same set of subcarriers for both the first and second OFDM symbols.

29. The apparatus of claim 27, wherein:

$$S \geq \sum_{i=0}^{M-1} N_{C,i},$$

where S is number of subcarriers with pilot symbols, M is number of transmit antennas, and $$\sum_{i=0}^{m} N_{C,i}$$

is the length of cyclic delay for transmit antenna m, for m=0,...,M−1.

30. The apparatus of claim 27, wherein:

$$p \leq \frac{N_{FFT}}{\sum_{i=0}^{M-1} N_{C,i}},$$

where M is number of transmit antennas and $$\sum_{i=0}^{m} N_{C,i}$$

is the length of cyclic delay for transmit antenna m, for m=0,...,M−1.

31. An apparatus for performing channel estimation in a wireless communication system, comprising:
logic for obtaining first input samples comprising first and second pilots, the first pilot being generated based on a first cyclic delay and sent from a first transmit antenna, the second pilot being generated based on a second cyclic delay and sent from a second transmit antenna, the second cyclic delay being larger than the first cyclic delay by at least a cyclic prefix length, and the first input samples being from a first receive antenna; and
logic for processing the first input samples based on pilot subcarriers spaced apart by p to obtain a first channel estimate for the first transmit antenna and a second channel estimate for the second transmit antenna, where p is a prime number that does not divide $N_{FFT}$, and $N_{FFT}$ is an FFT size for an OFDM symbol.

32. The apparatus of claim 31, further comprising:
logic for obtaining second input samples comprising the first and second pilots, the second input samples being from a second receive antenna; and
logic for processing the second input samples to obtain a third channel estimate for the first transmit antenna and a fourth channel estimate for the second transmit antenna.

33. The apparatus of claim 32, wherein the logic for processing the second input samples comprises:
logic for processing the second input samples to obtain observations for the pilot subcarriers; and
logic for processing the observations to obtain the third and fourth channel estimates.

34. The apparatus of claim 33, wherein the logic for processing the second input samples to obtain observations comprises:
logic for performing OFDM demodulation on the second input samples to obtain received pilot symbols for the pilot subcarriers; and
logic for removing pilot modulation from the received pilot symbols to obtain the observations for the pilot subcarriers.

35. The apparatus of claim 33, wherein the logic for processing the observations comprises logic for processing the observations based on a minimum mean square error (MMSE) technique to obtain the third and fourth channel estimates.

36. The apparatus of claim 31, wherein the logic for processing the first input samples comprises:
logic for processing the first input samples to obtain observations for the pilot subcarriers; and
logic for processing the observations to obtain the first and second channel estimates.

37. The apparatus of claim 36, wherein the logic for processing the first input samples to obtain observations comprises:
logic for performing OFDM demodulation on the first input samples to obtain received pilot symbols for the pilot subcarriers; and
logic for removing pilot modulation from the received pilot symbols to obtain the observations for the pilot subcarriers.

38. The apparatus of claim 36, wherein the logic for processing the observations comprises logic for processing the observations based on a minimum mean square error (MMSE) technique to obtain the first and second channel estimates.

39. An apparatus for transmitting pilots in a wireless communication system, comprising:
means for generating a first pilot for a first transmit antenna based on a first cyclic delay; and
means for generating a second pilot for a second transmit antenna based on a second cyclic delay larger than the first cyclic delay by at least a cyclic prefix length,
wherein the means for generating the first pilot and the means for generating the second pilot comprise means for generating OFDM symbols that comprise pilot symbols mapped to subcarriers spaced apart by p, where p is a prime number that does not divide $N_{FFT}$, and $N_{FFT}$ is an FFT size for the generated OFDM symbols.

40. The apparatus of claim 39, further comprising:
means for generating a third pilot for a third transmit antenna based on a third cyclic delay larger than the second cyclic delay by at least the cyclic prefix length.

41. The apparatus of claim 39, wherein the cyclic delay for each transmit antenna is $$t_m = \sum_{i=0}^{m} N_{C,i},$$

for m=0,1,...,M−1, where $N_{C,0} \geq 0$, $N_{C,i} \geq N_{CP}$ $\forall i \geq 1$, $N_{CP}$ is the cyclic prefix length, m is a transmit antenna index, and $t_m$ is the cyclic delay for transmit antenna m, for m=0,1,...,M−1.

42. The apparatus of claim 39, wherein the first cyclic delay is zero and the second cyclic delay is equal to or greater than the cyclic prefix length.

43. The apparatus of claim 39, wherein the first and second cyclic delays are not sent by signaling.

44. The apparatus of claim 39, wherein:
the means for generating the first pilot further comprises means for generating a first sample sequence comprising the first pilot and cyclically delaying the first sample sequence by the first cyclic delay; and
the means for generating the second pilot further comprises means for generating a second sample sequence comprising the second pilot and cyclically delaying the second sample sequence by the second cyclic delay.

45. The apparatus of claim 39, wherein the generated OFDM symbols comprise a first OFDM symbol comprising the first pilot and having the first cyclic delay and a second OFDM symbol comprising the second pilot and having the second cyclic delay.

46. The apparatus of claim 45, wherein the pilot symbols are mapped to the same set of subcarriers for both the first and second OFDM symbols.

47. The apparatus of claim 45, wherein:

$$S \geq \sum_{i=0}^{M-1} N_{C,i},$$

where S is number of subcarriers with pilot symbols, M is number of transmit antennas, and $$\sum_{i=0}^{m} N_{C,i}$$

is the length of cyclic delay for transmit antenna m, for m=0,...,M−1.

48. The apparatus of claim 45, wherein:

$$p \leq \frac{N_{FFT}}{\sum_{i=0}^{M-1} N_{C,i}},$$

where M is number of transmit antennas and $$\sum_{i=0}^{m} N_{C,i}$$

is the length of cyclic delay for transmit antenna m, for m=0,...,M−1.

49. An apparatus for performing channel estimation in a wireless communication system, comprising:
means for obtaining first input samples comprising first and second pilots, the first pilot being generated based on a first cyclic delay and sent from a first transmit antenna, the second pilot being generated based on a second cyclic delay and sent from a second transmit antenna, the second cyclic delay being larger than the first cyclic delay by at least a cyclic prefix length, and the first input samples being from a first receive antenna; and
means for processing the first input samples based on pilot subcarriers spaced apart by p to obtain a first channel estimate for the first transmit antenna and a second channel estimate for the second transmit antenna, where p is a prime number that does not divide $N_{FFT}$, and $N_{FFT}$ is an FFT size for an OFDM symbol.

50. The apparatus of claim 49, further comprising:
means for obtaining second input samples comprising the first and second pilots, the second input samples being from a second receive antenna; and
means for processing the second input samples to obtain a third channel estimate for the first transmit antenna and a fourth channel estimate for the second transmit antenna.

51. The apparatus of claim 50, wherein the means for processing the second input samples comprises:
means for processing the second input samples to obtain observations for the pilot subcarriers; and
means for processing the observations to obtain the third and fourth channel estimates.

52. The apparatus of claim 51, wherein the means for processing the second input samples to obtain observations comprises:
means for performing OFDM demodulation on the second input samples to obtain received pilot symbols for the pilot subcarriers; and
means for removing pilot modulation from the received pilot symbols to obtain the observations for the pilot subcarriers.

53. The apparatus of claim 51, wherein the means for processing the observations comprises means for processing the observations based on a minimum mean square error (MMSE) technique to obtain the third and fourth channel estimates.

54. The apparatus of claim 49, wherein the means for processing the first input samples comprises:
means for processing the first input samples to obtain observations for the pilot subcarriers; and
means for processing the observations to obtain the first and second channel estimates.

55. The apparatus of claim 54, wherein the means for processing the first input samples to obtain observations comprises:
means for performing OFDM demodulation on the first input samples to obtain received pilot symbols for the pilot subcarriers; and
means for removing pilot modulation from the received pilot symbols to obtain the observations for the pilot subcarriers.

56. The apparatus of claim 54, wherein the means for processing the observations comprises means for processing the observations based on a minimum mean square error (MMSE) technique to obtain the first and second channel estimates.

57. A computer-program product for transmitting pilots in a wireless communication system, comprising a non-transitory computer readable medium having instructions stored thereon, the instructions being executable by one or more processors and the instructions comprising:
instructions for generating a first pilot for a first transmit antenna based on a first cyclic delay; and instructions for generating a second pilot for a second transmit antenna based on a second cyclic delay larger than the first cyclic delay by at least a cyclic prefix length, wherein the instructions for generating the first pilot and the instructions for generating the second pilot comprise instructions for generating OFDM symbols that comprise pilot symbols mapped to subcarriers spaced apart by p, where p is a prime number that does not divide $N_{FFT}$, and $N_{FFT}$ is an FFT size for the generated OFDM symbols.

58. The computer-program product of claim 57, wherein the instructions further comprise:
instructions for generating a third pilot for a third transmit antenna based on a third cyclic delay larger than the second cyclic delay by at least the cyclic prefix length.

59. The computer-program product of claim 57, wherein the cyclic delay for each transmit antenna is $$t_m = \sum_{i=0}^{m} N_{C,i},$$

for m=0,1, . . . ,M−1,
where $N_{C,0} \geq 0$, $N_{C,i} \geq N_{CP}$ $\forall i \geq 1$, $N_{CP}$ is the cyclic prefix length, m is a transmit antenna index, and $t_m$ is the cyclic delay for transmit antenna m, for m=0,1, . . . ,M−1.

60. The computer-program product of claim 57, wherein the first cyclic delay is zero and the second cyclic delay is equal to or greater than the cyclic prefix length.

61. The computer-program product of claim 57, wherein the first and second cyclic delays are not sent by signaling.

62. The computer-program product of claim 57, wherein:
the instructions for generating the first pilot further comprise instructions for generating a first sample sequence comprising the first pilot and cyclically delaying the first sample sequence by the first cyclic delay; and
the instructions for generating the second pilot further comprise instructions for generating a second sample sequence comprising the second pilot and cyclically delaying the second sample sequence by the second cyclic delay.

63. The computer-program product of claim 57, wherein the generated OFDM symbols comprise a first OFDM symbol comprising the first pilot and having the first cyclic delay and a second OFDM symbol comprising the second pilot and having the second cyclic delay.

64. The computer-program product of claim 63, wherein the pilot symbols are mapped to the same set of subcarriers for both the first and second OFDM symbols.

65. The computer-program product of claim 63, wherein:

$$S \geq \sum_{i=0}^{M-1} N_{C,i},$$

where S is number of subcarriers with pilot symbols, M is number of transmit antennas, and $$\sum_{i=0}^{m} N_{C,i}$$

and is the length of cyclic delay for transmit antenna m, for m=0, . . . ,M−1.

66. The computer-program product of claim 63, wherein:

$$p \leq \frac{N_{FFT}}{\sum_{i=0}^{M-1} N_{C,i}},$$

where M is number of transmit antennas and $$\sum_{i=0}^{m} N_{C,i}$$

is the length of cyclic delay for transmit antenna m, for m=0, . . . ,M−1.

67. A computer-program product for performing channel estimation in a wireless communication system, comprising a non-transitory computer readable medium having instructions stored thereon, the instructions being executable by one or more processors and the instructions comprising:
instructions for obtaining first input samples comprising first and second pilots, the first pilot being generated based on a first cyclic delay and sent from a first transmit antenna, the second pilot being generated based on a second cyclic delay and sent from a second transmit antenna, the second cyclic delay being larger than the first cyclic delay by at least a cyclic prefix length, and the first input samples being from a first receive antenna; and
instructions for processing the first input samples based on pilot subcarriers spaced apart by p to obtain a first channel estimate for the first transmit antenna and a second channel estimate for the second transmit antenna, where p is a prime number that does not divide $N_{FFT}$, and $N_{FFT}$ is an FFT size for an OFDM symbol.

68. The computer-program product of claim 67, wherein the instructions further comprise:
instructions for obtaining second input samples comprising the first and second pilots, the second input samples being from a second receive antenna; and
instructions for processing the second input samples to obtain a third channel estimate for the first transmit antenna and a fourth channel estimate for the second transmit antenna.

69. The computer-program product of claim 68, wherein the instructions for processing the second input samples comprise:
instructions for processing the second input samples to obtain observations for the pilot subcarriers; and
instructions for processing the observations to obtain the third and fourth channel estimates.

70. The computer-program product of claim 69, wherein the instructions for processing the second input samples to obtain observations comprise:
instructions for performing OFDM demodulation on the second input samples to obtain received pilot symbols for the pilot subcarriers; and
instructions for removing pilot modulation from the received pilot symbols to obtain the observations for the pilot subcarriers.

71. The computer-program product of claim 69, wherein the instructions for processing the observations comprise instructions for processing the observations based on a minimum mean square error (MMSE) technique to obtain the third and fourth channel estimates.

72. The computer-program product of claim 67, wherein the instructions for processing the second input samples comprise:
   instructions for processing the first input samples to obtain observations for the pilot subcarriers; and
   instructions for processing the observations to obtain the first and second channel estimates.

73. The computer-program product of claim 72, wherein the instructions for processing the first input samples to obtain observations comprise:
   instructions for performing OFDM demodulation on the first input samples to obtain received pilot symbols for the pilot subcarriers; and
   instructions for removing pilot modulation from the received pilot symbols to obtain the observations for the pilot subcarriers.

74. The computer-program product of claim 72, wherein the instructions for processing the observations comprise instructions for processing the observations based on a minimum mean square error (MMSE) technique to obtain the first and second channel estimates.

\* \* \* \* \*